US011526914B2

(12) United States Patent
Sullivan et al.

(10) Patent No.: US 11,526,914 B2
(45) Date of Patent: *Dec. 13, 2022

(54) METHODS AND APPARATUS TO ADJUST MEDIA IMPRESSIONS BASED ON MEDIA IMPRESSION NOTIFICATION LOSS RATES IN NETWORK COMMUNICATIONS

(71) Applicant: The Nielsen Company (US), LLC, New York, NY (US)

(72) Inventors: Jonathan Sullivan, Hurricane, UT (US); Michael Sheppard, Brooklyn, NY (US); Albert Ronald Perez, Beaverton, OR (US); Alejandro Terrazas, Santa Cruz, CA (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/362,520

(22) Filed: Jun. 29, 2021

(65) Prior Publication Data
US 2021/0357992 A1 Nov. 18, 2021

Related U.S. Application Data

(63) Continuation of application No. 16/450,457, filed on Jun. 24, 2019, now Pat. No. 11,055,752, which is a
(Continued)

(51) Int. Cl.
*G06Q 30/02* (2012.01)
*H04L 43/0829* (2022.01)
*H04L 43/50* (2022.01)

(52) U.S. Cl.
CPC ..... *G06Q 30/0277* (2013.01); *G06Q 30/0261* (2013.01); *H04L 43/0829* (2013.01); *H04L 43/50* (2013.01)

(58) Field of Classification Search
CPC ........... G06Q 30/0261; G06Q 30/0277; H04L 43/0829; H04L 43/50
(Continued)

(56) References Cited

U.S. PATENT DOCUMENTS 5,481,294 A * 1/1996 Thomas ................. H04H 20/31
725/19
6,108,637 A 8/2000 Blumenau
(Continued)

OTHER PUBLICATIONS

United States Patent and Trademark, "Non-Final Office Action," issued in connection with U.S. Appl. No. 14/757,416, dated Jan. 17, 2017, 13 pages.
(Continued)

*Primary Examiner* — Scott D Gartland
(74) *Attorney, Agent, or Firm* — Hanley, Flight & Zimmerman, LLC

(57) ABSTRACT

Methods and apparatus to adjust media impressions based on media impression notification loss rates in network communications are disclosed. An example method includes determining a first network media impression adjustment factor based on a quantity of lost test media impression notifications for a first network in a geographic region; determining an adjusted quantity of first network user-accessed media impression notifications for the first network by applying the first network media impression adjustment factor to a quantity of successfully received user-accessed media impression notifications to generate a product and weighting the product based on a market share of first subscribers corresponding to the first network in the geographic region; and storing the weighted adjusted quantity of the user-accessed media impression notifications in association with a media identifier to credit corresponding media with a quantity of media accesses corresponding to the
(Continued)

weighted adjusted quantity of the user-accessed media impression notifications.

18 Claims, 5 Drawing Sheets

Related U.S. Application Data continuation of application No. 14/864,416, filed on Sep. 24, 2015, now Pat. No. 10,332,158.

(58) Field of Classification Search
USPC .......................................... 705/14.58, 14.73
See application file for complete search history.

(56) References Cited

U.S. PATENT DOCUMENTS

| | | | |
|---|---|---|---|
| 6,647,548 B1 * | 11/2003 | Lu | H04H 60/37 725/20 |
| 6,654,411 B1 | 11/2003 | Roberts et al. | |
| 7,333,439 B2 | 2/2008 | Itoh et al. | |
| 7,421,510 B2 | 9/2008 | Padmanabhan et al. | |
| 7,729,381 B2 | 6/2010 | Savoor et al. | |
| 7,924,739 B2 | 4/2011 | Sen et al. | |
| 7,933,392 B1 | 4/2011 | Hannan et al. | |
| 8,270,314 B2 | 9/2012 | Finn et al. | |
| 8,370,489 B2 | 2/2013 | Mazumdar et al. | |
| 8,688,524 B1 | 4/2014 | Ramalingam et al. | |
| 8,843,626 B2 | 9/2014 | Mazumdar et al. | |
| 9,237,339 B1 * | 1/2016 | Bordner-Babayigit | H04L 65/80 |
| 10,045,057 B2 | 8/2018 | Shah et al. | |
| 10,237,419 B2 | 3/2019 | Shah et al. | |
| 10,332,158 B2 | 6/2019 | Sullivan et al. | |
| 10,694,045 B2 | 6/2020 | Shah et al. | |
| 11,055,752 B2 | 7/2021 | Sullivan et al. | |
| 11,102,357 B2 | 8/2021 | Shah et al. | |
| 11,349,999 B2 | 5/2022 | Shah et al. | |
| 2002/0010919 A1 * | 1/2002 | Lu | H04N 21/658 725/18 |
| 2008/0075103 A1 | 3/2008 | Noble et al. | |
| 2011/0158112 A1 * | 6/2011 | Finn | H04L 43/0829 370/252 |
| 2012/0072469 A1 * | 3/2012 | Perez | G06Q 30/0201 707/810 |
| 2012/0143713 A1 | 6/2012 | Dittus et al. | |
| 2012/0158954 A1 | 6/2012 | Heffernan et al. | |
| 2013/0035980 A1 | 2/2013 | Verma et al. | |
| 2013/0046615 A1 | 2/2013 | Liyanage | |
| 2013/0332604 A1 | 12/2013 | Seth et al. | |
| 2014/0003263 A1 | 1/2014 | Sheriff | |
| 2014/0003342 A1 | 1/2014 | Sheriff et al. | |
| 2014/0095702 A1 | 4/2014 | Kalus et al. | |
| 2014/0108130 A1 | 4/2014 | Vos et al. | |
| 2014/0156761 A1 | 6/2014 | Heffernan et al. | |
| 2014/0269850 A1 | 9/2014 | Abdelmonem et al. | |
| 2014/0279074 A1 | 9/2014 | Chen et al. | |
| 2014/0324544 A1 * | 10/2014 | Donato | G06Q 30/0204 705/7.33 |
| 2014/0337104 A1 * | 11/2014 | Splaine | G06Q 30/0204 705/7.33 |
| 2015/0019322 A1 | 1/2015 | Alla et al. | |
| 2015/0193816 A1 | 7/2015 | Toupet et al. | |
| 2015/0262207 A1 | 9/2015 | Rao et al. | |
| 2017/0091834 A1 | 3/2017 | Sullivan et al. | |
| 2018/0332177 A1 | 11/2018 | Shah et al. | |
| 2019/0378177 A1 | 12/2019 | Sullivan et al. | |
| 2021/0385336 A1 | 12/2021 | Shah et al. | |

OTHER PUBLICATIONS

United States Patent and Trademark, "Corrected Notice of Allowability," issued in connection with U.S. Appl. No. 14/757,416, dated Jul. 11, 2018, 5 pages.

United States Patent and Trademark, "Notice of Allowance and Fee(s) Due," issued in connection with U.S. Appl. No. 14/757,416, dated Feb. 6, 2018, 8 pages.

United States Patent and Trademark, "Non-Final Office Action," issued in connection with U.S. Appl. No. 14/757,416, dated Sep. 21, 2017, 15 pages.

United States Patent and Trademark, "Final Office Action," issued in connection with U.S. Appl. No. 14/757,416, dated Jul. 13, 2017, 15 pages.

United States Patent and Trademark, "Final Office Action," issued in connection with U.S. Appl. No. 14/864,416, dated May 23, 2018, 23 pages.

United States Patent and Trademark, "Non-Final Office Action," issued in connection with U.S. Appl. No. 14/864,416, dated Oct. 17, 2017, 16 pages.

United States Patent and Trademark, "Advisory Action," issued in connection with U.S. Appl. No. 14/864,416, dated Aug. 31, 2018, 4 pages.

United States Patent and Trademark, "Notice of Allowance and Fee(s) Due," issued in connection with U.S. Appl. No. 16/003,720, dated Nov. 1, 2018, 8 pages.

United States Patent and Trademark, "Notice of Allowance and Fee(s) Due," issued in connection with U.S. Appl. No. 16/291,801, dated Feb. 19, 2020, 8 pages.

United States Patent and Trademark, "Non-Final Office Action," issued in connection with U.S. Appl. No. 16/291,801, dated Sep. 18, 2019, 8 pages.

United States Patent and Trademark, "Notice of Allowance and Fee(s) Due," issued in connection with U.S. Appl. No. 14/864,416, dated Feb. 6, 2019, 10 pages.

Lodish et al., "How T.V. Advertising Works: A Meta-Analysis of 389 Real World Split Cable T.V. Advertising Experiments," Journal of Marketing Research, vol. 32, No. 2, May 1995, pp. 125-139, 16 pages.

United States Patent and Trademark Office, "Non-Final Office Action," issued in connection with U.S. Appl. No. 16/450,457, dated Sep. 24, 2020, 9 pages.

United States Patent and Trademark Office, "Notice of Allowance and Fee(s) Due," issued in connection with U.S. Appl. No. 16/450,457, dated Mar. 2, 2021, 10 pages.

United States Patent and Trademark Office, "Supplemental Notice of Allowability," issued in connection with U.S. Appl. No. 16/450,457, dated Apr. 9, 2021, 7 pages.

United States Patent and Trademark Office, "Notice of Allowance and Fee(s) Due," issued in connection with U.S. Appl. No. 16/900,485, dated Mar. 31, 2021, 17 pages.

United States Patent and Trademark Office, "Notice of Allowability," issued in connection with U.S. Patenl U.S. Appl. No. 16/900,485, dated Apr. 14, 2021, 5 pages.

United States Patent and Trademark Office, "Notice of Allowability," issued in connection with U.S. Patenl U.S. Appl. No. 16/900,485, dated Apr. 19, 2021, 5 pages.

United States Patent and Trademark Office, "Notice of Allowance and Fee(s) Due," issued in connection with U.S. Appl. No. 17/406,940, dated Feb. 16, 2022, 8 pages.

United States Patent and Trademark, "Non-final Office Action," issued in connection with U.S. Appl. No. 14/757,416, dated Jan. 7, 2017, 13 pages.

United States Patent and Trademark, "Non-Final Office Action," issued in connection with U.S. Appl. No. 17/362,520, dated Apr. 12, 2022, 11 pages.

* cited by examiner

METHODS AND APPARATUS TO ADJUST MEDIA IMPRESSIONS BASED ON MEDIA IMPRESSION NOTIFICATION LOSS RATES IN NETWORK COMMUNICATIONS

RELATED APPLICATIONS

This patent arises from a continuation of U.S. patent application Ser. No. 16/450,457, which is a continuation of U.S. patent application Ser. No. 14/864,416, filed on Sep. 24, 2015, granted as U.S. Pat. No. 10,332,158, both of which are hereby incorporated herein by reference in their entireties.

FIELD OF THE DISCLOSURE

This disclosure relates generally to audience measurements, and, more particularly, to methods and apparatus to adjust media impressions based on media impression notification loss rates in network communications.

BACKGROUND

Techniques for monitoring user access to Internet resources such as web pages, advertisements and/or other Internet-accessible media have evolved significantly over the years. Some known systems perform such monitoring through server logs. In particular, entities serving media on the Internet can use known techniques to log the number of requests received for their media (e.g., content and/or advertisements) at their server. Other techniques involve client devices (e.g., computers, mobile telephones, etc.) sending notifications to a data collection facility of impressions to Internet-accessed media. In some examples, these notices are provided to a third party to obtain demographic information corresponding to users of the devices.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
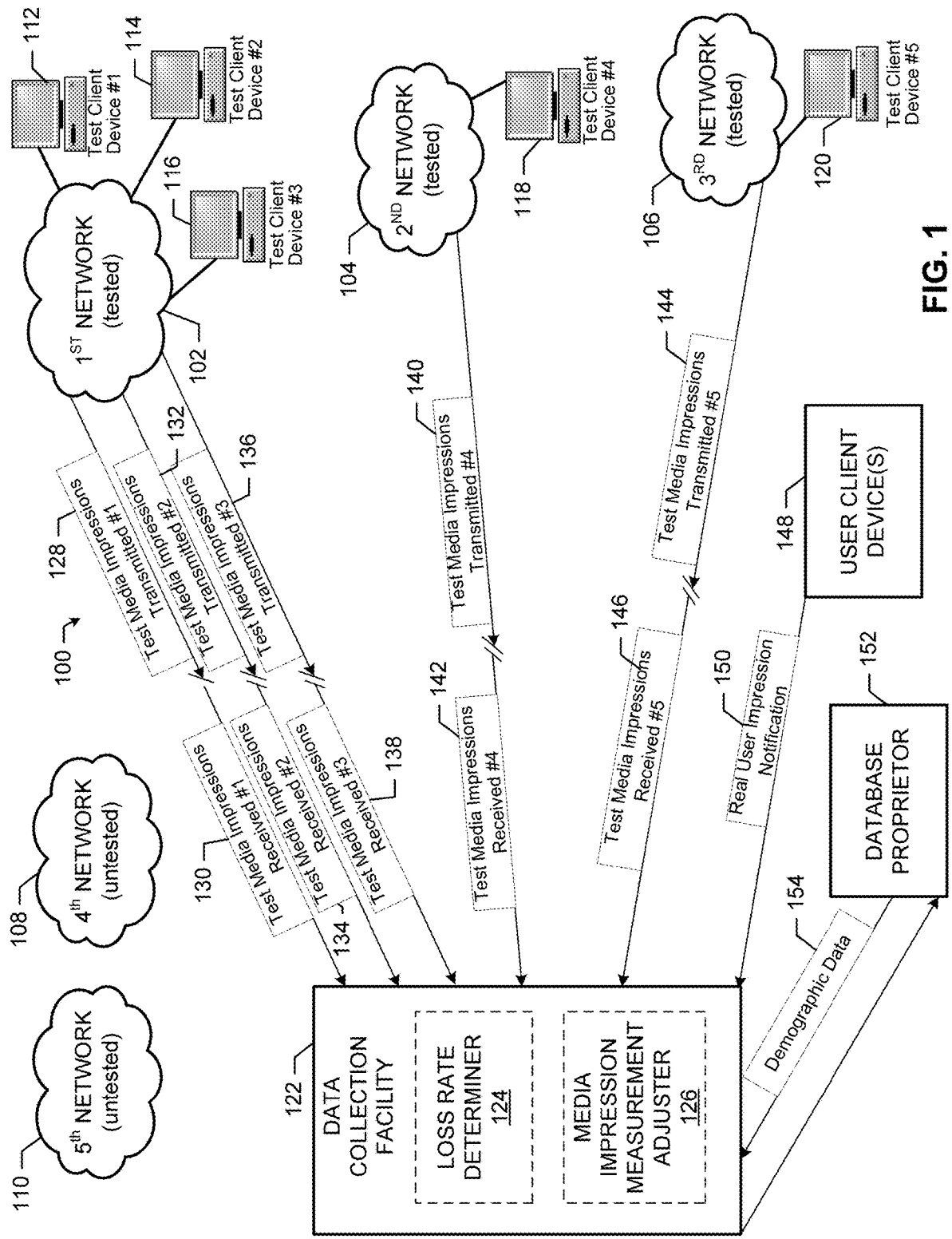
FIG. 1 illustrates an example system for measuring loss rates of media impression notifications in network communications and adjusting media impression measurements based on the measured media impression notification loss rates.

Examples disclosed herein relate to methods and apparatus for measuring media impression notification loss rates (e.g., spatial-temporal media impression loss rates) in network communications and applying such media impression notification loss rates to media impression measures to generate adjusted media impression measures and/or adjusted online campaign ratings. In examples disclosed herein, a media impression notification or message is sent by a client device to a remote impression collection device in response to the client device accessing media. For example, the media impression notification may have a media identifier indicative of the accessed media and a user/device identifier that can be used to identify a user of the client device or to identify the client device.

In some examples, a media impression notification is sent by a client device in the form of a hypertext transfer protocol (HTTP) request to an impression collection server or computer. For example, the HTTP request used to report an impression may be a dummy request that does not actually result in any meaningful information being sent back to the client device by the impression collection server. Alternatively, the dummy HTTP request reporting the impression may result in a dummy 1×1 transparent or unobtrusive pixel being sent back to the client device from the impression collection server.

In some examples, by applying media impression notification loss rates to media impression measures, an adjusted quantity of impressions may be determined that accounts for, or is representative of, both a quantity of media impression notifications successfully received at a data collection facility and a quantity of media impression notifications not successfully received at the data collection facility. In some examples, the adjusted quantity of impressions includes impressions associated with one or more tested networks (e.g., networks on which test client devices send and/or automatically send test media impression notifications for the purpose of measuring media impression notification loss rates) and/or impressions associated with one or more untested networks (e.g., networks on which test client devices are not provided to send media impression notifications for the purpose of measuring media impression notification loss rates).

In some examples, to determine media impression notification loss rates for one or more networks communicating in different geographic regions, one or more test client devices are installed in the different geographical locations (e.g., New York City, Chicago, Dallas, Los Angeles, etc.) to send (e.g., automatically send) media impression notifications on the one or more networks in those regions. In examples disclosed herein, a test client device is an electronic device such as a desktop computer, a laptop computer, a server, a mobile telephone, a network device, etc., that is configured to send test media impression notifications addressed to an impression collection device at a data collection facility. For example, a test client may be configured to automatically send a particular quantity of test media impression notifications periodically or aperiodically within a particular quantity of time. In this manner, a number of test media impression notifications sent by the test client device over a particular duration is known when a test media impression notification loss rate is being determined.

As used herein, a test media impression notification is used to test successful transmission performance and transmission loss characteristics of networks. A test impression notification simulates a message or communication from a device notifying an impression collection server or computer that the device has accessed media. A real user media impression notification that a client device sends to an impression collection server or computer is in response to actually accessing media at the client device. The real user media impression notification includes, for example, a media identifier to identify the accessed media, a user and/or device identifier to identify the user of the client device and/or to identify the client device, a timestamp to identify the data/time when the media was accessed, a source identifier (e.g., a publisher/provider/server uniform resource locator (URL)) to identify an internet location from where the media was obtained, a host identifier (e.g., a URL) to identify the website through which the media was accessed, a placement identification (ID) and/or other suitable information to identify characteristics of the accessed media. However, unlike the real user media impression notification that notifies of an actual media impression, a test media impression notification simulates a notification of a media impression. Though, in other examples, a test client device can access media to trigger sending of the test media impression notifications, such media impression notifications are measuring media impression notification loss rates and not for logging impressioning correspond to real people accessing media.

The test media impression notifications are configured to have the same or similar characteristics (e.g., byte length, format and payload size) as real media impression notifications even though the test media impression notifications do not report on real accesses to media as do the real media impression notifications. By configuring the test media impression notifications to appear the same as or similar to real media impression notifications, measured information transmissions successes and losses of tested networks are based on transmission formats and sizes of real media impression notifications. In this manner, test conditions simulate real transmission conditions so that any data transmission handling (e.g., buffering, congestion, mitigation, packet inspection, etc.) that a network would apply to a real media impression notification, and that may lead to transmission loss, will also be applied to test media impression notifications due to the test media impression notifications having the same or similar characteristics as real media impression notifications. In some examples, a media impression notification may be transmitted using one or more data packets in a packet based network and/or one or more frames in a circuit switched network.

In some examples, to estimate media impression notification loss rates for first and second networks, a first test client device operating on the first network transmits test media impression notifications in packet form to a data collection facility at a predetermined rate and a second test client device operating on the second network transmits test media impression notifications in, for example, packet form at a predetermined rate to the data collection facility and/or as a particular quantity of communications transmitted aperiodically to the data collection facility. In some examples, the media impression notification loss rate for the respective networks is determined based on a difference between the number of test media impression notifications sent by the different test client devices and the number of test media impression notifications received by the data collection facility.

In some examples, the media impression notification loss rate is used in combination with an estimated market share of the measured networks to determine impression adjustment factors for the measured networks. In some examples, the impression adjustment factors for the respective networks can be applied to online media exposure/impression measures to improve the accuracies of such measures. In some examples, the online media exposure/impression measures are associated with respective designated market areas (DMA) and include media identifications (IDs), placement IDs, demographics and/or numbers of recorded impressions.

In some examples, to apply a first impression adjustment factor to online media exposure/impression measures, the first impression adjustment factor for a first network is applied to a total received impression count and/or a recorded impression count for a designated market area to determine an adjusted quantity of impressions for the first network. In some examples, the adjusted quantity of impressions includes both impressions that were successfully received by the data collection facility via the first network and impressions that were not successfully received via the first network. In some examples, the adjusted quantity of impressions for the first network is summed with other adjusted quantities of impressions for other networks to determine a total adjusted quantity of impressions across numerous networks including real media impression notifications that were lost in transmission in different geographic regions and/or on different networks.

FIG. 1 is an example system 100 for measuring media impression notification loss rates in network communications and applying such media impression notification loss rates to media impression measures to generate adjusted media impression measures. In examples disclosed herein, adjusted media impression measures are representative of impressions of media accessed at client devices including impressions corresponding to media impression notifications from such client devices that were and were not successfully received at a data collection facility. In this example, the system 100 is configured to measure media impression notification loss rates in a geographic region (e.g., New York City) that includes different internet service providers (ISPs) and/or networks including an example first network 102, an example second network 104, an example third network 106, an example fourth network 108 and an example fifth network 110. In other examples, one or more of the networks 102, 104, 106, 108, 110 is/are separately located in two or more geographic regions (e.g., New York City, Los Angeles, San Francisco, etc.).

In the illustrated example, to measure media impression notification loss rates of the first network 102, the second network 104 and the third network 106 (e.g., tested networks), example first, second and third test client devices 112, 114, 116 are configured to be in communication with the first network 102, an example fourth test client device 118 is configured to be in communication with the second network 104 and an example fifth test client device 120 is configured to be in communication with the third network 106. In some examples, the first, second and third test client devices 112, 114, 116 are installed in different regions of a metropolitan area (e.g., different neighborhoods or city blocks of New York City). While in this example, three test client devices 112, 114, 116 are configured to be in communication with the first network 102 and one test client device 118, 120 is configured to be in communication with each of the second and third networks 104, 106, in other examples, any number of test client devices (e.g., 1, 2, 3, 4, etc.) may be used in communication with any of the networks 102, 104, 106, 108 and/or 110. In this example, media impression notification loss rates are not being measured on the fourth network 108 and the fifth network 110 (e.g., untested networks). However, in other examples, the media impression notification loss rates for the fourth and/or the fifth networks 108 and/or 110 are measured.

In some examples, the system 100 is configured to measure media impression notification loss rates for networks and/or ISPs that have a number of subscribers greater than a threshold number of subscribers and/or a market share greater than a threshold market share percentage. As used herein, market share is a value representative of a number of subscribers of a service provider in a particular geographic area relative to either (1) a total population of people in that geographic area, or (2) a total sum of subscribers of the service provider and other service providers of the same type of service (e.g., wireless or wired Internet access service) in that same geographic area. Additionally or alternatively, the market share is a value representative of a number of subscribers of a tested service provider (e.g., a first network) in a particular geographic area relative to other tested service providers (e.g., the first network, a second network).

In some examples, the system 100 does not measure media impression notification loss rates for networks and/or ISPs having a number of subscribers less than the threshold number of subscribers and/or a market share less than the threshold percentage. Thus, in this example, the first, second and third networks 102, 104, 106 may be representative of networks having more than the threshold number of subscribers and/or threshold market share percentage and the fourth and fifth networks 108, 110 may be representative of networks having less than the threshold number of subscribers and/or threshold market share percentage.

In the illustrated example, to determine a media impression notification loss rate for the tested networks and/or to determine adjusted media impression measures, the example system 100 includes an example data collection facility 122. In this example, the data collection facility 122 includes an example loss rate determiner 124 and an example media impression measurement adjuster 126.

In the illustrated example, to determine a first media impression notification loss rate for the first network 102 based on test impression notifications from the first test client device 112, the first test client device 112 transmits first sent test media impression notifications 128 addressed to the data collection facility 122. In the illustrated example, the data collection facility 122 receives first received test media impression notifications 130 corresponding to some or all of the first sent test media impression notifications 128. To determine a second media impression notification loss rate for the first network 102 based on test impression notifications from the second test client device 114, the second test client device 114 transmits second sent test media impression notifications 132 addressed to the data collection facility 122. In the illustrated example, the data collection facility 122 receives second received test media impression notifications 134 corresponding to some or all of the second sent test media impression notifications 132. To determine a third media impression notification loss rate for the first network 102 based on the test impression notifications from the third test client device 116, the third test client device 116 transmits third sent test media impression notifications 136 addressed to the data collection facility 122. In the illustrated example, the data collection facility 122 receives third received test media impression notifications 138 corresponding to some or all of the third sent test media impression notifications 136.

To determine a fourth media impression notification loss rate for the second network 104 based on test impression notifications from the fourth test client device 118, the second test client device 118 transmits fourth sent test media impression notifications 140 addressed to the data collection facility 122. In the illustrated example, the data collection facility 122 receives fourth received test media impression notifications 142 corresponding to some or all of the fourth sent media impression notifications 140. To determine a fifth media impression notification loss rate for the third network 106 based on test impression notifications from the fifth test client device 120, the fifth test client device 120 transmits fifth sent test media impression notifications 144 addressed to the data collection facility 122. In the illustrated example, the data collection facility 122 receives fifth received test media impression notifications 146 corresponding to some or all of the fifth sent test media impression notifications 144. In some examples, the first, second, third, fourth and/or fifth test client devices 112, 114, 116, 118 and/or 120 all transmit the same number of test media impression notification messages addressed to the data collection facility 122 within a length of time. In some examples, one or more of the first, second, third, fourth and/or fifth test client devices 112, 114, 116, 118 and/or 120 transmit(s) a different number of test media impression notification messages addressed to the data collection facility 122 than others of the test client devices 114, 116, 118 and/or 120. In examples in which the first, second, third, fourth and/or fifth test client devices 112, 114, 116, 118 and/or 120 all transmit the same number of test media impression notification messages addressed to the data collection facility 122 within a length of time, each of the first, second, third, fourth and/or fifth test client devices 112, 114, 116, 118 and/or 120 may all transmit 6000 test media impression notification messages addressed to the data collection facility 122 within a 24 hour period. In examples in which one or more of the first, second, third, fourth and/or fifth test client devices 112, 114, 116, 118 and/or 120 transmit(s) a different number of test media impression notification messages addressed to the data collection facility 122 than others of the test client devices 114, 116, 118 and/or 120, the first, second and third test client devices 112, 114, 116 may each transmit 6000 test media impression notification messages addressed to the data collection facility 122 within a 24 hour period while the fourth and fifth test client devices 118 and 120 may each transmit 4000 test media impression notification messages addressed to the data collection facility 122 within a 24 hour period.

In some examples, using the number of sent test media impression notifications 128, 132, 136, 140, 144 and the number of received test media impression notifications 130, 134, 138, 142, 146, the loss rate determiner 124 uses Equation 1 below to determine a media impression notification loss rate, $p_i$, for the respective test client devices 112, 114, 116. Referring to Equation 1, $p_i$ corresponds to the media impression notification loss rate for a test client device, $r_i$ corresponds to a number of test media impression notifications received by the data collection facility 122 and $s_i$ corresponds to a number of test media impression notifications sent by the corresponding test client devices 112, 114, 116, 118, 120.

$$p_i = 1 - \frac{r_i}{s_i} \qquad \text{Equation 1}$$

Table 1 below represents example media impression notification loss rates, $p_i$, for the first, second, third, fourth and/or fifth test client devices 112, 114, 116, 118 and/or 120.

TABLE 1

| Client Device | $p_i$ |
|---|---|
| First Test Device | 0.0101 |
| Second Test Device | .0085 |
| Third Test Device | .0074 |
| Fourth Test Device | .1700 |
| Fifth Test Device | .0025 |

In examples in which one test client device is configured to be in communication with a network, the media impression notification loss rate for that test client device, $p_i$, corresponds to and/or is the same as a media impression notification loss rate for the network, $p_e$, on which the test client device is communicating. However, in examples in which more than one test client device is configured to be in communication with a particular network, the media impression notification loss rate, $p_i$, for the test client device may be different than the media impression notification loss rate, $p_e$, for the network on which the test client devices are communicating because different client devices may have different media impression notification loss rates, $p_i$, that are used to calculate the media impression notification loss rate, $p_e$, for the network. In some such examples, the loss rate determiner 124 uses Equation 2 below to determine the media impression notification loss rate for a network having multiple test client devices communicating thereon. Referring to Equation 2 below, i corresponds to the respective test client devices, $p_e$ corresponds to the media impression notification loss rate for a network, e corresponds to the network for which the media impression notification loss rate is being determined, $s_i$ corresponds to the number of test impression notifications sent by the test client device and $p_i$ corresponds to the media impression notification loss rate for the respective test client device. In some examples, the impression notification loss rate for the network, $p_e$, is an approximation.

$$p_e = \frac{\sum_{i=1}^{n} s_i p_i}{\sum_{i=1}^{n} s_i} \quad \text{Equation 2}$$

Table 2 represents example media impression notification loss rate approximations, $p_e$, for the first network 102, the second network 104 and the third network 106.

TABLE 2

| Network | $p_e$ |
| --- | --- |
| First network | 0.0087 |
| Second network | 0.1700 |
| Third network | 0.0025 |

In some examples, the loss rate determiner 124 uses the media impression notification loss rates, $p_e$, for the respective networks 102, 104, 106 to determine a network impression adjustment factor, $AF_e$. In some examples, the network impression adjustment factor, $AF_e$, can be applied to a total received impression count, $I_{DMA}$, for the designated market area in combination with a market share weighting factor, $w_e$, for the corresponding network to determine an adjusted impression count for a designated market area (DMA).

$$AF_e = \frac{1}{(1 - p_e)} \quad \text{Equation 3}$$

An example user client device 148 is also shown with the example system 100 of FIG. 1. In the illustrated example, the user client device 148 enables a user to access media via the Internet. When the client device 148 detects an access to such media, the user client device 148 sends a real user media impression notification 150 to the data collection facility 122. Examples of sending impression notifications (e.g., beacons, impression requests, etc.) from the user client device 148 to the data collection facility are disclosed in U.S. Pat. No. 8,370,489, titled, "methods and apparatus to determine impressions using distributed demographic information" and in U.S. Pat. No. 6,108,637, titled, "content display monitor." Both of U.S. Pat. Nos. 8,370,489 and 6,108,637 are hereby incorporated herein by reference in their entireties. The real user media impression notification 150 is used to notify the data collection facility 122 of media access by the user client device 148 operated by an actual person when the user client device 148 accessed the media. User impression notifications are used by an AME to measure media exposures to an actual audience of users of numerous user client devices. The user client device 148 may be any suitable device such as a computer, a tablet, a mobile device, a computing device, a phone, etc. While one user client device is shown in FIG. 1, in other examples, the system 100 includes more than one user client device (e.g., 10, 100, 1000, 10000, 100000, 500000, etc.).

In some examples, the user impression notification 150 received by the data collection facility 122 includes a user media impression notification 150 including a media ID and/or a placement ID. A media ID may identify any type of media including, for example, advertisements and/or content in the form of video, audio, webpage, text, images, songs, movies, user-credited/user-uploaded media, etc. A media ID may be an advertisement campaign ID, a uniform resource locator, a song title, a movie title, a news article title, a streaming station identifier and/or any other value, text string and/or information that may be used to identify accessed media. In some examples, a media ID may be a geographic-specific media ID that identifies a corresponding media intended for delivery to a particular geographic area (e.g., a DMA). For example, a campaign ID for an advertisement intended for delivery to New York would be useable to identify the corresponding advertisement and the corresponding DMA of New York. A placement ID may identify a screen or display location where an advertisement will appear on a webpage, for example.

In some examples, to obtain demographic information of a user associated with the user client device 148, the data collection facility 122 partners with an example database proprietor 152 (e.g., a database proprietor). In some examples, the database proprietor 152 provides demographic data 154 associated with the user media impression notification 150 to the data collection facility 122. For example, the data proprietor 152 may be implemented as an Internet-based service provider such as a social network site (e.g., Facebook, Twitter, MySpace, etc.), a multi-service site (e.g., Yahoo!, Google, Experian, Axiom, Catalina, etc.), an online retailer site (e.g., Amazon.com, Buy.com, etc.), and/ or any other web service(s) site that maintains user registration records. Techniques disclosed in U.S. Pat. No. 8,370, 489 may be used to share demographic information maintained by the database proprietor 152 with the data collection facility 122.

In some examples, the data collection facility 122 aggregates and/or organizes the data received including the media ID, a placement ID, the demographic data 154 and/or a corresponding number of recorded impressions. In some examples, the data collection facility 122 and/or the media impression measurement adjuster 126 can aggregate and/or organize example media IDs, example placement IDs, example demographic data and/or example recorded impressions into a table, such as Table 4.

TABLE 4

| Media ID | Placement ID | Demographic Bucket | Recorded Impressions |
|---|---|---|---|
| 558716 | 102 | M18-24 | 65,742 |
| 558716 | 103 | M18-24 | 12,598 |
| 558717 | 102 | M18-24 | 3,785 |
| 558717 | 103 | M118-24 | 7,277 |
| 558718 | 102 | M18-24 | 12,351 |
| 558718 | 103 | M18-24 | 5,482 |

In some examples, as mentioned above, some of the user media impression notifications transmitted by the user client device 148 may not be successfully received by the data collection facility 122. In examples disclosed herein, to facilitate accounting for the user media impression notifications that were lost in transmission due to, for example, network congestion, networking hardware failures, failed network paths, and/or network driver failures, the media impression measurement adjuster 126 applies the media impression notification loss rates (e.g., $p_e$, $p_i$) determined by the media impression notification loss rate determiner 124 to a recorded impression count corresponding to, for example, a designated market area. In some examples, the recorded impression count is determined by the data collection facility 122.

In the illustrated example, a normalized market share, $w_e$, is used when adjusting the recorded number of impressions to account for media impression notification loss rates in collected media impressions. In the illustrated example, the media impression measurement adjuster 126 determines a normalized market share, $w_e$, for the measured networks 102, 104, 106 using Equation 4. In other examples, the normalized market share does not account for subscribers within untested markets and/or unmeasured markets (e.g., the fourth and fifth untested networks 108, 110) because, for example, these networks have a number of subscribers less than the threshold number of subscribers and/or a market share less than the threshold percentage. In other examples, the normalized market share accounts for subscribers within the fourth and fifth untested networks 108, 110 to account for the subscribers of the untested markets. In some such examples, the denominator of Equation 4 is the total number of subscribers in all networks including the measured networks and the untested networks.

$$w_e = \frac{\text{number of subscribers for measured network}}{\text{total number of subscribers in measured networks}} \qquad \text{Equation 4}$$

Table 5 represents example normalized market share weighting factors, $w_e$, for the first network 102, the second network 104 and the third network 106.

TABLE 5

| Network | $w_e$ |
|---|---|
| First network | 0.6242 |
| Second network | 0.2040 |
| Third network | 0.1718 |

In the illustrated example, the media impression measurement adjuster 126 uses Equation 5 below to determine an adjusted quantity of impressions for the measured networks 102, 104, 106 including impressions corresponding to user impression notifications successfully received by the data collection facility 122 via the respective networks and impressions corresponding to user impression notifications not successfully received by the data collection facility 122 via the respective networks. Referring to Equation 5 below, $I_e$ corresponds to a total received impression count for a measured network in a designated market, $I_{DMA}$ corresponds to a total received impression count for the designated market area (DMA), $w_e$ corresponds to a normalized market share weighting factor for a network and $AF_e$ corresponds to a network impression adjustment factor for a measured network.

$$I_e = I_{DMA} * w_e * AF_e \qquad \text{Equation 5:}$$

In the illustrated example, the media impression measurement adjuster 126 uses Equation 6 below to determine an adjusted total impression count for the system 100, $I_{DMA'}$, by summing the total received impression counts, $I_e$, for the measured networks 102, 104, 106. In this example, the adjusted total impression count for the system 100 includes impressions successfully received by the data collection facility 122 via the networks 102, 104, 106 for a designated market area and impressions not successfully received by the data collection facility 122 via the networks 102, 104, 106 for the designated market areas.

$$I_{DMA'} = \Sigma_{e=1}^{n} I_e = \Sigma_{e=1}^{n} I_{DMA} * w_e * AF_e \qquad \text{Equation 6:}$$

In the illustrated example, the data collection facility 122 aggregates and/or organizes data including the media ID, the placement ID, the demographic data 154, recorded impressions and/or the adjusted and/or estimated impressions. For example, the data collection facility 122 and/or the media impression measurement adjuster 126 can aggregate and/or organize example media IDs, example placement IDs, example demographic data, example recorded impressions and/or example estimated and/or adjusted impressions into a table, such as table 6.

TABLE 6

| Media ID | Placement ID | Demographic Bucket | Recorded Impressions | Estimated Impressions |
|---|---|---|---|---|
| 558716 | 102 | M18-24 | 65,742 | 68,876 |
| 558716 | 103 | M18-24 | 12,598 | 13,199 |
| 558717 | 102 | M18-24 | 3,785 | 3,965 |
| 558717 | 103 | M118-24 | 7,277 | 7,624 |
| 558718 | 102 | M18-24 | 12,351 | 12,940 |
| 558718 | 103 | M18-24 | 5,482 | 5,743 |

Figure 2:
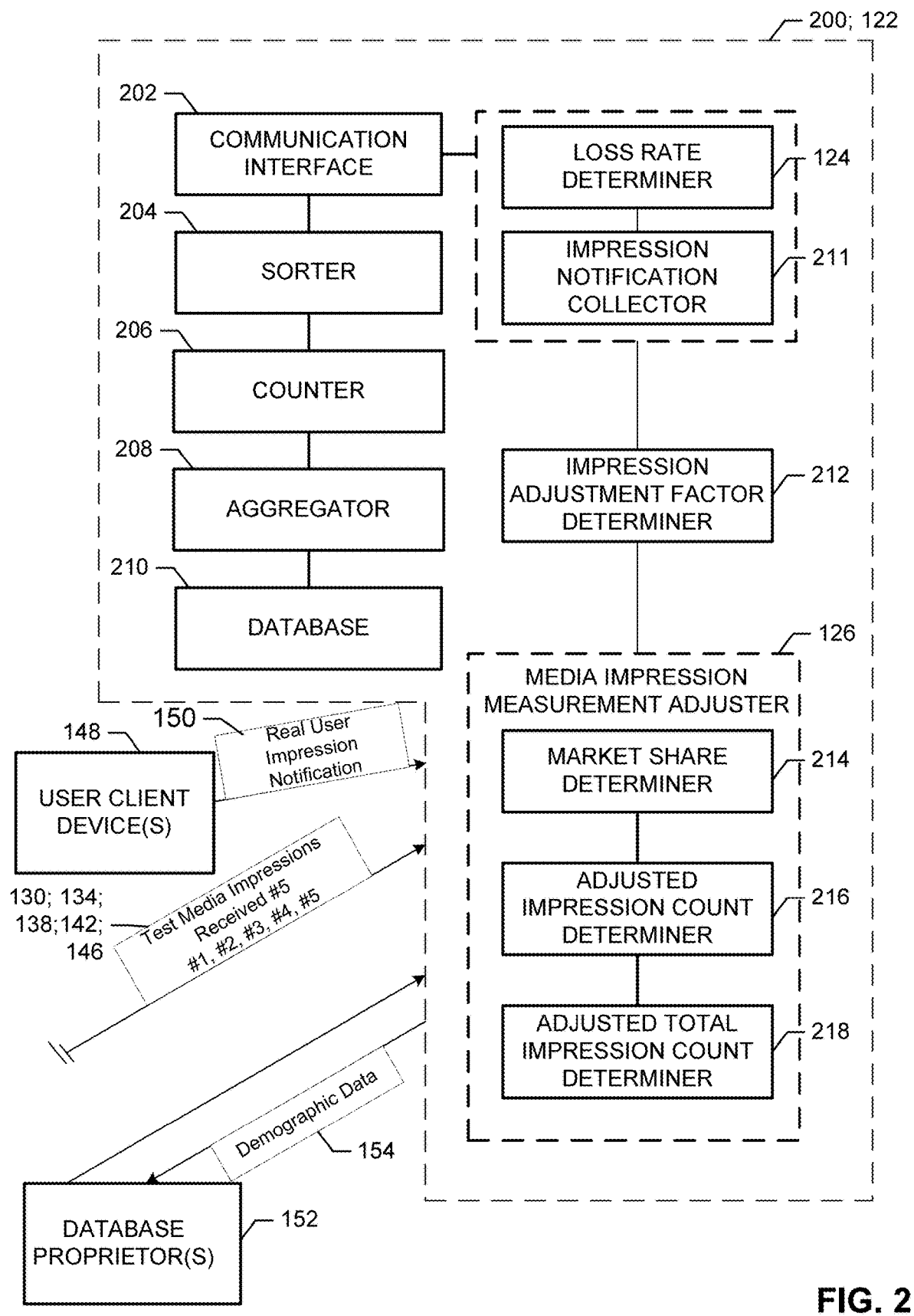
FIG. 2 illustrates an example apparatus that can be used to measure media impression notification loss rates and generate adjusted media impression measurements based on the media impression notification loss rates.

FIG. 2 illustrates an example apparatus 200 that can be implemented at the data collection facility 122 of FIG. 1 to measure media impression notification loss rates and generate adjusted media impression measurements based on the media impression notification loss rates. In this example, the apparatus 200 includes an example communication interface 202, an example sorter 204, an example counter 206, an example aggregator 208, an example database 210, the example loss rate determiner 124, the example media impression measurement adjuster 126, an example impression notification collector 211 and an example impression adjustment factor determiner 212. The media impression measurement adjuster 126 of the illustrated example includes an example tested market share determiner 214, an example adjusted impression count determiner 216 and an example adjusted total impression count determiner 218.

In the illustrated example, to estimate media impression notification loss rates, $p_i$, for the test client devices 112, 114, 116, 118, 120 and/or the first, second and/or third networks 102, 104, 106, the sent test media impression notifications 128, 132, 136, 140, 144 are sent by the test client devices 112, 114, 116, 118, 120 and the received test media impression notifications 130, 134, 138, 142, 146, 150 are received by the communication interface 202 of the apparatus 200. In the illustrated example, as the received test media impression notifications 130, 134, 138, 142, 146, 150 are being received by the apparatus 200, the counter 204 and/or the impression notification collector 211 count the test impression notifications and store a tally of the received test media impression notifications 130, 134, 138, 142, 146, 150 in the database 210. In the illustrated example, to determine a total number of sent test media impression notifications 128, 132, 136, 140, 144, the test client devices 112, 114, 116, 118, 120 transmit values representative of a corresponding total number of sent test media impression notifications 128, 132, 136, 140, 144 to the communication interface 202 of the apparatus 200. The example database 210 stores the total number of sent test media impression notifications 128, 132, 136, 140, 144.

In the illustrated example, to determine the media impression notification loss rates, $p_i$, for the test client devices 112, 114, 116, 118, 120, the loss rate determiner 124 obtains the total number of sent test media impression notifications 128, 132, 136, 140, 144 and the total number of received test media impression notifications 130, 134, 138, 142, 146, 150 from the database 210 and uses, for example, Equation 1 above, to determine the media impression notification loss rates, $p_i$, for the respective test client devices 112, 114, 116, 118, 120. In the illustrated example, the loss rate determiner 124 stores the determined media impression notification loss rates, $p_i$, in the database 210.

In the illustrated example, to determine the media impression notification loss rates, $p_e$, for the networks 102, 104, 106, the loss rate determiner 124 obtains the determined media impression notification loss rates, $p_i$, of the corresponding test client devices 112, 114, 116, 118, 120 from the database 210 and uses, for example, Equation 2 above, to determine the media impression notification loss rates, $p_e$, for the networks 102, 104, 106. In the illustrated example, the loss rate determiner 124 stores the determined media impression notification loss rates, $p_e$, in the database 210.

In examples disclosed herein, to determine the network impression adjustment factors, $AF_e$, for the networks 102, 104, 106, the impression adjustment factor determiner 212 obtains the media impression notification loss rates, $p_e$, for the corresponding networks 102, 104, 106 from the database 210 and uses, for example, Equation 3 above, to determine the network impression adjustment factors, $AF_e$, for the corresponding networks 102, 104, 106. In examples disclosed herein, the network impression adjustment factors, $AF_e$, can be applied to the total received impression count, $I_{DMA}$, for a designated market area in combination with a market share, $w_e$, for the respective network to determine an adjusted impression count for the designated market area.

In the illustrated example, as the user media impression notifications 150 are received by the apparatus 200, the sorter 204 sorts the user media impression notifications 150 based on, for example, the media ID and/or the placement ID. The example counter 206 and/the example impression notification collector 211 count(s) the respective user media impression notifications 150 and the recorded impressions corresponding thereto. In the illustrated example, a tally of the different user media impression notifications 150 and/or the recorded impressions is stored in the database 210.

In the illustrated example, to obtain demographic information (e.g., a demographic bucket identifier) of a user associated with the user client device 148, the data collection facility 122 uses the communication interface 202 to receive the demographic information 154 from the example database proprietor 152. For example, the database proprietor 152 transmits the demographic data 154 associated with the corresponding user client device 148 to the communication interface 202 of the apparatus 200. In the illustrated example, the communication interface 202 stores the demographic data 154 in the database 210.

In the illustrated example, to aggregate the demographic data 154, the recorded impression count and the corresponding user media impression notifications 150, the aggregator 208 obtains the user media impression notifications 150, the corresponding demographic data 154 and recorded impression count from the database 210 and aggregates and/or organizes the data into, for example, a table, such as table 4 above.

In the illustrated example, to facilitate accounting for the user media impression notifications that were lost in transmission due to media impression notification loss rates, the media impression measurement adjuster 126 applies the media impression notification loss rates (e.g., $p_e$, $p_i$) determined by the media impression notification loss rate determiner 126 to a recorded impression count corresponding to, for example, a designated market area. In the illustrated example, the normalized market share weighting factor, $w_e$, is used when determining the adjusted quantity of impressions, $I_e$, for the measured networks 102, 104, 106. In the illustrated example, to determine the normalized market share weighting factor, $w_e$, for the measured networks 102, 104, 106, the tested market share determiner 214 obtains a number of subscribers for the different networks 102, 104, 106, 108, 110 and uses, for example, Equation 4 above, to determine the normalized market share weighting factor, $w_e$, for the measured networks 102, 104, 106. In some examples, the market share determiner 214 stores the normalized market share weighting factor, $w_e$, for the measured networks 102, 104, 106 in the database 210.

In the illustrated example, to determine the adjusted quantity of impressions, $I_e$, for the measured networks 102, 104, 106, the adjusted impression count determiner 216 obtains the total received impression count for the designated market area, $I_{DMA}$, the normalized market share, $w_e$, for a corresponding network, and the network impression adjustment factor, $AF_e$, for the corresponding network from the database 210. The adjusted impression count determiner 216 uses, for example, Equation 5 above, to determine the adjusted quantity of impressions, $I_e$, for the measured networks 102, 104, 106. In the illustrated example, the adjusted quantity of impressions, $I_e$, for the measured networks 102, 104, 106 includes impressions successfully received by the data collection facility 122 via the respective networks and impressions not successfully received by the data collection facility 122 via the respective networks. In the illustrated example, the adjusted impression count determiner 216 stores the adjusted quantity of impressions, $I_e$, for the measured networks 102, 104, 106 in the database 210.

In the illustrated example, to determine an adjusted total impression count, $I_{DMA'}$, for the system 100, the adjusted total impression count determiner 218 obtains the adjusted quantity of impressions, $I_e$, for the measured networks 102, 104, 106 from the database 210. The adjusted total impression count determiner 218 uses, for example, Equation 6 above, to determine the adjusted total impression count, $I_{DMA'}$, for the system 100. In the illustrated example, the adjusted total impression count determiner 218 stores the adjusted total impression count, $I_{DMA'}$, for the system 100 in the database 210.

In the illustrated example, to aggregate the demographic data 154, the user media impression notifications 150, the recorded impression count and the adjusted impression count for the different designate market areas, the aggregator 208 obtains the user media impression notifications 150, the corresponding demographic data 154 and the recorded and adjusted impression count from the database 210 and aggregates and/or organizes the data into, for example, a table such as table 6.

While an example manner of implementing the data collection facility of FIG. 1 is illustrated in FIG. 2, one or more of the elements, processes and/or devices illustrated in FIG. 2 may be combined, divided, re-arranged, omitted, eliminated and/or implemented in any other way. Further, the example communication interface 202, the example sorter 204, the example counter 206, the example aggregator 208, the example database 210, the example impression notification collector 211, the example loss rate determiner 124, the example impression adjustment factor determiner 212, the example media impression measurement adjuster 1226, the example tested market share determiner 214, the example adjusted impression count determiner 216, the example adjusted total impression count determiner 218, the example user client device(s) 148, the example database proprietor 152 and/or, more generally, the example apparatus 200 of FIG. 2 may be implemented by hardware, software, firmware and/or any combination of hardware, software and/or firmware. Thus, for example, any of the example communication interface 202, the example sorter 204, the example counter 206, the example aggregator 208, the example database 210, the example impression notification collector 211, the example loss rate determiner 124, the example impression adjustment factor determiner 212, the example media impression measurement adjuster 1226, the example tested market share determiner 214, the example adjusted impression count determiner 216, the example adjusted total impression count determiner 218, the example user client device(s) 148, the example database proprietor 152 and/or, more generally, the example apparatus 200 of FIG. 2 could be implemented by one or more circuit(s), programmable processor(s), application specific integrated circuit(s) (ASIC(s)), programmable logic device(s) (PLD(s)) and/or field programmable logic device(s) (FPLD(s)), etc. When reading any of the apparatus or system claims of this patent to cover a purely software and/or firmware implementation, at least one of the example communication interface 202, the example sorter 204, the example counter 206, the example aggregator 208, the example database 210, the example impression notification collector 211, the example loss rate determiner 124, the example impression adjustment factor determiner 212, the example media impression measurement adjuster 1226, the example tested market share determiner 214, the example adjusted impression count determiner 216, the example adjusted total impression count determiner 218, the example user client device(s) 148, the example database proprietor 152 and/or, more generally, the apparatus 200 of FIG. 2 are hereby expressly defined to include a tangible computer readable storage device or storage disc such as a memory, DVD, CD, Blu-ray, etc. storing the software and/or firmware. Further still, the example data collection device 122 of FIG. 1 may include one or more elements, processes and/or devices in addition to, or instead of, those illustrated in FIG. 2, and/or may include more than one of any or all of the illustrated elements, processes and devices.

Figure 3A:
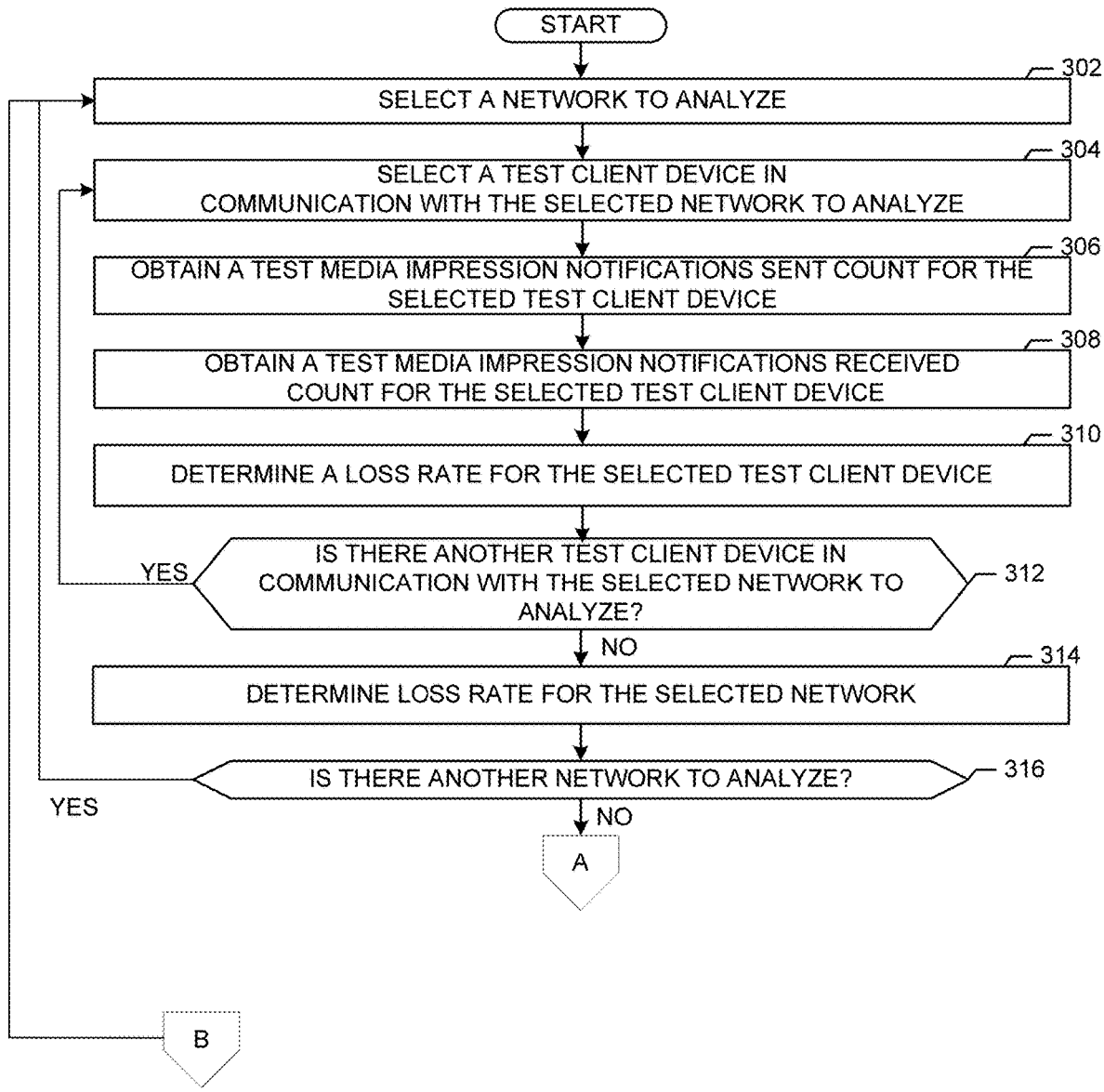
FIGS. 3A and 3B is a flowchart representative of machine readable instructions that may be executed to implement the example apparatus of FIGS. 1 and/or 2 to adjust media impression notification loss rates.
Figure 3B:
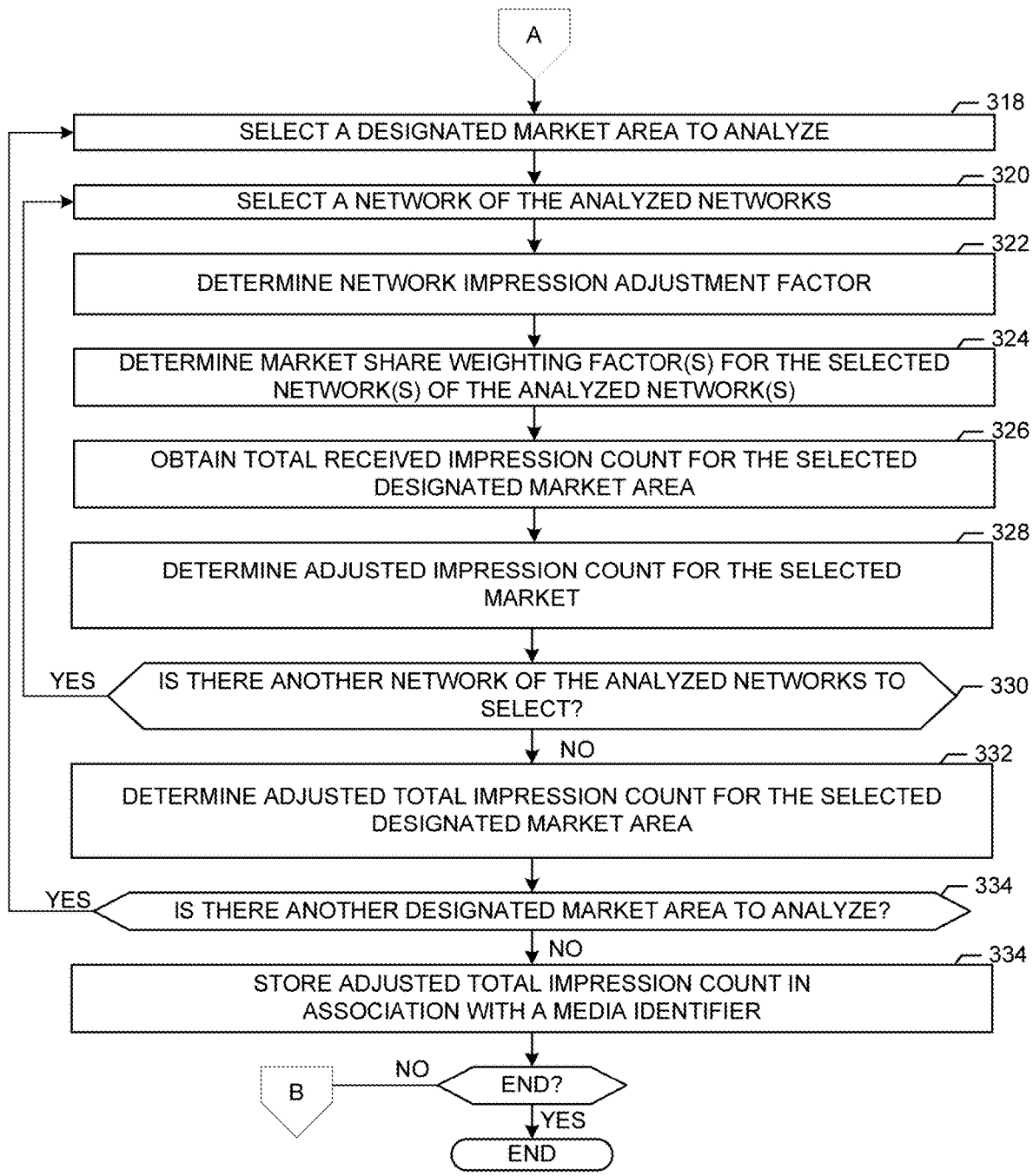

A flowchart representative of example machine readable instructions for implementing the example system 100 of FIG. 1 and/or the example apparatus 200 of FIG. 2 is shown in FIGS. 3A and 3B. In this example, the machine readable instructions comprise a program for execution by a processor such as the processor 412 shown in the example processor platform 400 discussed below in connection with FIG. 4. The program may be embodied in software stored on a tangible computer readable storage medium such as a CD-ROM, a floppy disk, a hard drive, a digital versatile disk (DVD), a Blu-ray disk, or a memory associated with the processor 412, but the entire program and/or parts thereof could alternatively be executed by a device other than the processor 412 and/or embodied in firmware or dedicated hardware. Further, although the example program is described with reference to the flowchart illustrated in FIGS. 3A and 3B, many other methods of implementing the example the example system 100 of FIG. 1 and/or the example apparatus 200 of FIG. 2 may alternatively be used. For example, the order of execution of the blocks may be changed, and/or some of the blocks described may be changed, eliminated, or combined.

As mentioned above, the example processes of FIGS. 3A and 3B may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 3A and 3B may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disc and to exclude propagating signals. As used herein, when the phrase "at least" is used as the transition term in a preamble of a claim, it is open-ended in the same manner as the term "comprising" is open ended.

The method of FIGS. 3A and 3B begins by selecting a network to analyze (block 302). For example, the impression notification selector 211 (FIG. 2) may select one of the first network 102, the second network 104 or the third network 106 of FIG. 1. In some examples, the apparatus (FIG. 2) selects the first network 102 to analyze. The method selects a test client device in communication with the selected network to analyze (block 304). For example, the impression notification collector 211 (FIG. 2) may select one of the first, second, third, fourth and/or fifth test client devices 112, 114, 116, 118, 120 in communication with one of the selected networks 102, 104, 106. For example, if the data collection facility 122 selects the first network 102 to analyze at block 302, the data collection facility 122 may select at block 304 the first test client device 112 to analyze.

The method obtains the test impression notification sent count for the selected test client device (block 306). For example, the loss rate determiner 124 obtains the quantity of the sent test media impression notifications 128, 132, 136, 140, 144 (FIG. 1) from the database 210 (FIG. 2). For example, if the first test client device 112 is selected at block 304, the loss rate determiner 124 may obtain the number of the first sent test media impression notifications 128 from the database 210.

The method obtains the test impression notification received count for the selected test client device (block 308). For example, the loss rate determiner 124 obtains the quantity of received test impression notifications 130, 134, 138, 142, 146 from the database 210 (FIG. 2) corresponding to the test client device selected at block 304. For example, if the first test client device 112 is the selected test client device, the loss rate determiner 124 may obtain the number of the first received test media impression notifications 130 from the database 210.

The method determines the media impression notification loss rate for the selected test client device based on the test impression notification sent count and the test impression notification received count (block 310). For example, the loss rate determiner 124 determines the media impression notification loss rate by using the total number of sent test media impression notifications 128, 132, 136, 140, 144 and the total number of received test media impression notifications 130, 134, 138, 142, 146 with Equation 1 above. At block 312, the method determines if there is another test client device in communication with the selected network to analyze. For example, if the first network 102 and the first test client device 112 are initially selected, the process may determine to analyze the second test client device 114. If there is another test client device to analyze, control returns to block 304.

If there are no additional test client devices in communication with the selected network to analyze, the method determines the media impression notification loss rate for the selected network based, $p_e$ (block 314). For example, the loss rate determiner 124 determines the media impression notification loss rate for the selected network, $p_e$, based on the determined media impression notification loss rates for the client device(s), $p_t$, the number of test impression notifications sent by the test client device $s_t$ and Equation 2 above. At block 316, the apparatus 200 determines if there is another network to analyze. For example, if the first network 102 is initially selected to analyze, the process may select the second network 104 to analyze.

The method selects a designated market area (block 318) (FIG. 3B). For example, the impression adjustment factor determiner 212 selects a designated market area corresponding to a geographic region, a city, a state, an area of a metropolitan area, a media ID within a designated market area, a geographic-specific media ID, a placement ID within a designated market area and/or any other suitable geographic area, etc. The method selects a network of the analyzed networks (block 320). For example, the impression adjustment factor determiner 212 selects one of the first network 102, the second network 104 and/or the third network 106.

The method determines the network impression adjustment factor (block 322). For example, the impression adjustment factor determiner 212 obtains the media impression notification loss rates, $p_e$, for the network 102, 104, 106 selected at block 320 from the database 210. The example impression adjustment factor determiner 212 determines the network impression adjustment factor, $AF_e$, based on the media impression notification loss rates, $p_e$, and Equation 3 above.

The method determines the market share weighting factor for the network selected at block 320 (block 324). For example, the tested market share determiner 214 obtains a number of subscribers for the analyzed networks 102, 104, 106, 108, 110 and determines the market share weighting factor, the total number of subscribers in the measured networks and/or the total number of subscribers in all networks including the measured networks and the untested networks and Equation 4 above. The method obtains a total received impression count for the selected designated market area (block 326). For example, the counter 206 and/or the impression notification collector 211 counts the respective user media impression notifications 150 corresponding to the user client device 148 and the recorded impressions corresponding thereto.

The method determines an adjusted impression count for the selected designated market area (block 328). For example, the adjusted impression count determiner 216 (FIG. 2) applies the corresponding market share and the corresponding network adjustment factor of the designated market area to the total received user media impression count. In the illustrated example, the adjusted impression count determiner 216 obtains the total received impression user media count for the designated market area, $I_{DMA}$, the normalized market share weighting factor, $w_e$, for a corresponding network, and the network impression adjustment factor, $AF_e$, for the measured network, from the database 210 for use with Equation 5 above to determine the network adjustment factor of the designated market area. At block 330, the method determines if there is another network to analyze. For example, if the first network 102 is initially selected to analyze, the process may select the second network 104 at block 330 to analyze.

The adjusted total impression count is determined for the selected designated market area (block 332). For example, the adjusted total impression count determiner 218 obtains the adjusted quantity of impressions, $I_e$, for the measured networks 102, 104, 106 from the database 210 and Equation 6 above. At block 334, the method determines if there is another designated market area to analyze. For example, if a first designated market area is initially selected to analyze, the apparatus 200 may select a second designated market area to analyze. At block 334, the method stores the adjusted quantity of impressions in association with a media identifier. For example, the database 210 stores the weighted adjusted quantity of the user-accessed media impression notifications in association with a media identifier to credit corresponding media with a quantity of media accesses corresponding to the weighted adjusted quantity of the user-accessed media impression notifications.

Figure 4:
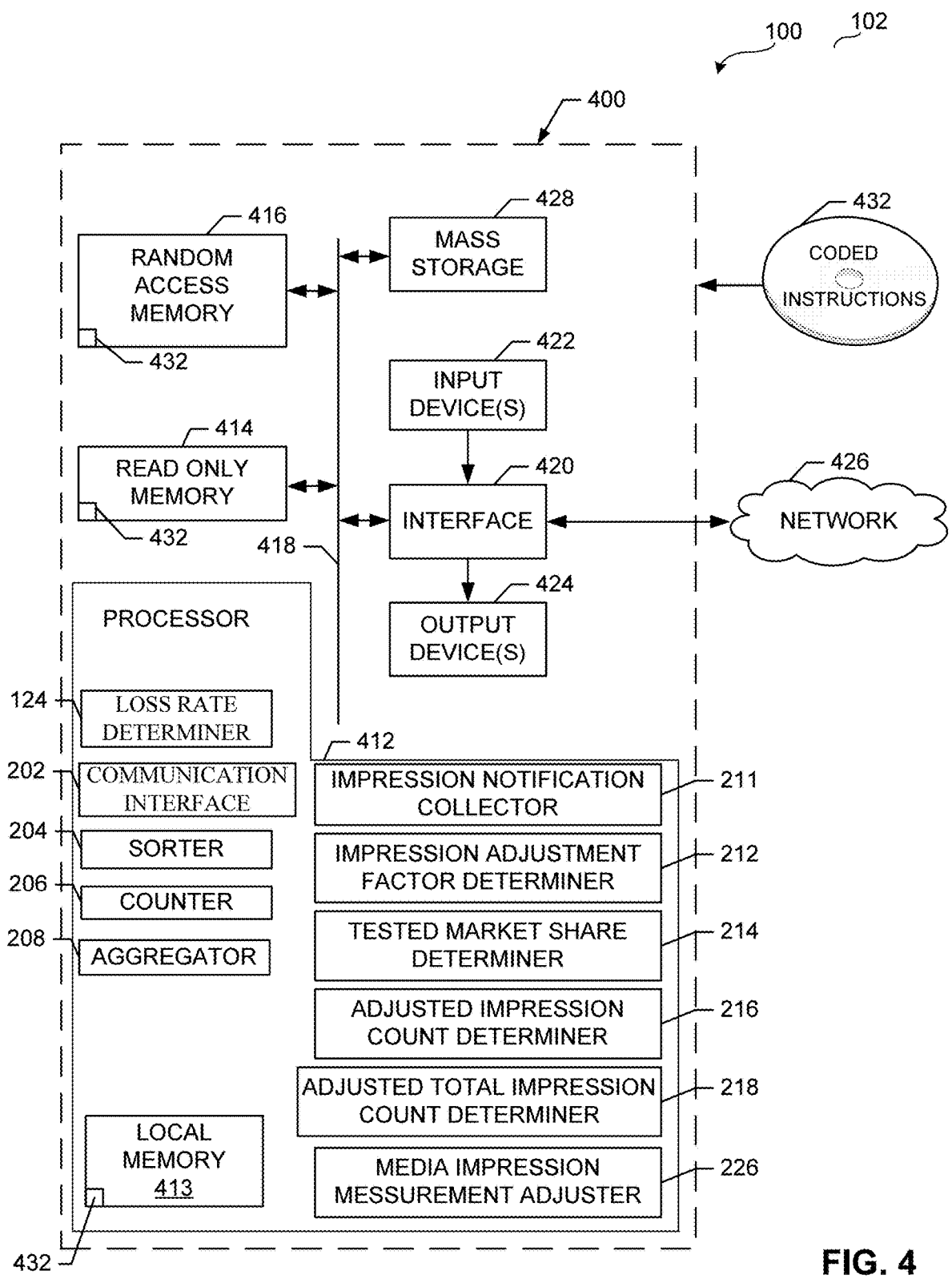
FIG. 4 is an example processor platform to execute the instructions of FIGS. 3A and 3B to implement the apparatus of FIGS. 1 and/or 2.

FIG. 4 is a block diagram of an example processor platform 1000 capable of executing the instructions of FIGS. 3A and 3B to implement the system 100 of FIG. 1 and/or the data collection facility 122 of FIG. 2. The processor platform 400 can be, for example, a server, a personal computer.

In some examples, the processor 412 implements one or more of the example loss rate determiner 124, the example user client device(s) 148, the example database proprietor 152, the example communication interface 202, the example sorter 204, the example counter 206, the example aggregator 208, the example database 210, the example impression notification collector 211, the example impression adjustment factor determiner 212, the example tested market share determiner 214, the example adjusted impression count determiner 216, the example adjusted total impression count determiner 218, the example media impression measurement adjuster 226, The processor platform 400 of the illustrated example includes a processor 412. The processor 412 of the illustrated example is hardware. For example, the processor 412 can be implemented by one or more integrated circuits, logic circuits, microprocessors or controllers from any desired family or manufacturer.

In some examples, the processor 412 implements one or more of example loss rate determiner 124, the example communication interface 202, the example sorter 204, the example counter 206, the example aggregator 208, the example impression notification collector 211, the example impression adjustment factor determiner 212, the example tested market share determiner 214, the example adjusted impression count determiner 216, the example adjusted total impression count determiner 218 and/or the example media impression measurement adjuster 226.

The processor 412 of the illustrated example includes a local memory 413 (e.g., a cache). The processor 412 of the illustrated example is in communication with a main memory including a volatile memory 414 and a non-volatile memory 416 via a bus 418. The volatile memory 414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 416 may be implemented by flash memory and/or any other desired type of memory device. Access to the main memory 414, 416 is controlled by a memory controller.

The processor platform 400 of the illustrated example also includes an interface circuit 420. The interface circuit 420 may be implemented by any type of interface standard, such as an Ethernet interface, a universal serial bus (USB), and/or a PCI express interface.

In the illustrated example, one or more input devices 422 are connected to the interface circuit 420. The input device(s) 422 permit a user to enter data and commands into the processor 412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 424 are also connected to the interface circuit 420 of the illustrated example. The output devices 424 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 420 of the illustrated example, thus, typically includes a graphics driver card.

The interface circuit 420 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 400 of the illustrated example also includes one or more mass storage devices 428 for storing software and/or data. Examples of such mass storage devices 428 include floppy disk drives, hard drive disks, compact disk drives, Blu-ray disk drives, RAID systems, and digital versatile disk (DVD) drives.

Coded instructions 432 to implement the machine readable instruction of FIGS. 3A and 3B may be stored in the mass storage device 428, in the volatile memory 414, in the non-volatile memory 1016, and/or on a removable tangible computer readable storage medium such as a CD or DVD.

From the foregoing, it will be appreciated that the above disclosed methods, apparatus and articles of manufacture overcome errors in network communications that result in loss of transmitted information without burdening network devices or client devices with needing to retransmit such lost information and without burdening network devices or client devices to perform a bandwidth-demanding and processor-demanding acknowledgement of successful transmission exchange with a data collection server. Thus, the examples disclosed herein enable media impression notification loss rates to be determined in a manner that is noninvasive and/or less invasive to client devices and/or network devices. When counting media impressions notifications representative of media accessed at client devices, media impression collection and measurement processes rely on successful network communications to successfully receive such media impression notifications at a data collection server from client devices. Successful network communications increases the accuracy of media impression measures that are based on impression reporting from client devices. However, when network communications fail, media impression notifications transmitted by client devices are less likely to be successfully received by a data collection server. Such failures can significantly decrease the accuracies of media impression measures.

Some prior techniques to overcome failed network communications involve burdening network devices and client devices with performing acknowledgement exchanges between source and destination devices and/or retransmitting information to increase the likelihood that such information will be successfully received at an intended destination device (e.g., a data collection server). However, such prior techniques place an increased processing demand on source and/or destination devices to process such acknowledgment exchanges and/or information retransmissions and/or increase the load time of a page, degrading the user's experience. In addition, such acknowledgment exchanges and/or information retransmissions also require bandwidth resources of networks, which decrease the amount of bandwidth available to other communications.

Examples disclosed herein can be advantageously used to maintain relatively highly accurate media impression measures based on media impression notifications from client devices without needing to burden client devices, network devices and/or other network resources to use additional processing resources and bandwidth resources to perform acknowledgement exchanges and/or retransmit information. That is, examples disclosed herein determine the amount of information that is likely to be lost in transmission through a network, determine adjustment factors based on such information transmission loss, and apply those adjustment factors to quantities of successfully received media impression notifications to determine more accurate media impression notification counts that are representative of media impression notifications that were successfully received at a data collection server from client devices and representative of media impression notifications that failed to be received at the data collection server from client devices.

An example method includes determining a media impression notification loss rate for a network based on a test impression notification receipt count and a test impression notification transmitted count, the test impression notification receipt count representing a first quantity of test impression notifications successfully received at a data collection facility via the network; determining a network impression adjustment factor based on the media impression notification loss rate and based on a market share weighting factor of the network; and determining an adjusted impression count by applying the network impression adjustment factor to a total received impression count, the total received impression count indicative of a second quantity of impressions reported by a plurality of devices and successfully received at the data collection facility for a market including the network, the adjusted impression count representative of a quantity of media accesses at the plurality of the devices, and the adjusted impression count representative of the second quantity of impression notification successfully received at the data collection facility via the network and a third quantity of impression notifications not successfully received at the data collection facility via the network.

In some examples, the media notification impression loss rate is a first media impression notification loss rate, the network is a first network, the test impression notification receipt count is a first test impression notification receipt count, the test impression notification transmitted count is a first test impression notification transmitted count, and further including: determining a second media impression notification loss rate for a second network based on a second test impression notification receipt count and a second test impression notification transmitted count, the second test impression notification receipt count representing a fourth quantity of impressions successfully received at the data collection facility via the second network; determining a second network impression adjustment factor based on the second media impression notification loss rate and based on a second market share weighting factor of the second network; and determining a second adjusted impression count by applying the second network impression adjustment factor to the total received impression count, the total received impression count indicative of the second quantity of impressions reported by the plurality of devices and successfully received at the data collection facility for the market of networks serving a geographic region, the market including the second network, the second adjusted impression count representative of a quantity of exposures to media at the plurality of the devices via the second network, and the adjusted impression count including the second quantity of impressions successfully received at the data collection facility via the second network and a fifth quantity of impressions not successfully received at the data collection facility via the second network.

In some examples, the first network and the second network serve the same geographic region. In some examples, the method includes summing the first adjusted impression count and the second adjusted impression count to determine a third adjusted impression count, the third adjusted impression count representative of a quantity of exposures to media at the plurality of the devices via the first and second networks, the first and second networks representing a substantial portion of the market of networks serving a geographic region. In some examples, the method includes transmitting a fourth quantity of test impression notifications to a data collection facility, the fourth quantity representing the test impression notification transmitted count. In some examples the method includes receiving the first quantity of test impression notifications at the data collection facility, the first quantity representing the test impression notification transmitted count. In some examples, a difference between the first quantity and the fourth quantity is representative of the media impression loss notification rate for the network.

In some examples, the market share weighting factor of the network represents a percentage of the market accounted for by the network. In some examples, the determining of the media impression loss rate includes determining a first media impression loss rate for a first test client device in communication with the network and determining a second media impression loss rate for a second test client device in communication with the network, the media impression loss rate being determined based on the first media impression loss rate and the second media impression loss rate.

An example method to determine media impression measures, includes determining a first network media impression adjustment factor based on a quantity of lost test media impression notifications for a first network in a geographic region; determining an adjusted quantity of first network user-accessed media impression notifications for the first network by applying the first network media impression adjustment factor to a quantity of successfully received user-accessed media impression notifications to generate a product and weighting the product based on a market share of first subscribers corresponding to the first network in the geographic region, the quantity of successfully received user-accessed media impression notifications including a quantity of successfully received user-accessed media impression notifications received via the first network; and storing the weighted adjusted quantity of the user-accessed media impression notifications in association with a media identifier to credit corresponding media with a quantity of media accesses corresponding to the weighted adjusted quantity of the user-accessed media impression notifications.

In some examples, the quantity of the lost test media impression notifications for the first network is due to communication failures in the first network. In some examples, the adjusted quantity of the first network user-accessed media impression notifications includes a total media impression count corresponding to the quantity of the successfully received user-accessed media impression notifications for the first network and a quantity of lost user-accessed media impression notifications for the first network. In some examples, the successfully received user-accessed media impression notifications for the first network correspond to media impression notifications successfully received at a data collection facility when sent via the first network by first subscriber client devices of the first network and addressed to the data collection facility, the lost user-accessed media impression notifications not successfully received at the data collection facility when sent via the first network by at least some of the first subscriber client devices of the first network or second subscriber client devices of the first network and addressed to the data collection facility.

In some examples, the lost test media impression notifications are sent via the first network automatically by a test client device that is not operated by a user. In some examples, the market share is a first market share, further includes determining a second network media impression adjustment factor based on a quantity of lost test media impression notifications for a second network in the geographic region; and determining an adjusted quantity of second network user-accessed media impression notifications for the second network by applying the second media impression adjustment factor to the quantity of successfully received user-accessed media impression notifications to generate a product and weighting the product based on a second market share of second subscribers corresponding to the second network in the geographic region.

In some examples, the method also includes summing the adjusted quantity of first network user-accessed media impression notifications for the first network and the adjusted quantity of second network user-accessed media impression notifications for the second network to determine a third adjusted quantity of user-accessed media impression notifications, the first and second markets representing a substantial portion of a market of networks serving a geographic region. In some examples, the market share of first subscribers corresponding to the first network in the geographic region is relative to second subscribers of other networks in the geographic region.

In some examples, the determining of the first network media impression adjustment factor is based on a first media impression loss rate for a first test client device in communication with the first network and a second media impression loss rate for a second test client device in communication with the first network, the media impression loss rate being determined based on the first media impression loss rate and the second media impression loss rate.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. An apparatus comprising:
    at least one memory;
    machine-readable instructions stored in the apparatus; and
    processor circuitry to execute the instructions to:
        collect a first quantity of test impression notifications received via first network communications, the first quantity of test impression notifications being less than a second quantity of test impression based on a transmission loss characteristic of a first network, the second quantity of test impression notifications transmitted by a test client device,
        collect a first quantity of media impression notifications received via second network communications, the second network communications transmitted by second client devices via the first network in response to media accessed via the second client devices, the first quantity of media impression notifications being less than a second quantity of media impression notifications based on the transmission loss characteristic of the first network, the second quantity of media impression notifications transmitted by the second client devices,
        determine a first network media impression adjustment factor for the first network in a geographic region based on a difference between the first quantity of test impression notifications and the second quantity of test impression notifications,
        determine a weighted adjusted quantity of user-accessed media impression notifications for the first network by applying the first network media impression adjustment factor to the first quantity of media impression notifications to generate a product and weighting the product based on a market share of first subscribers corresponding to the first network in the geographic region, the weighted adjusted quantity of the user-accessed media impression notifications to correct an inaccuracy in the first quantity of media impressions notifications, the inaccuracy resulting from the transmission loss characteristic of the first network, and
        store the weighted adjusted quantity of the user-accessed media impression notifications in association with a media identifier to credit corresponding media with a quantity of media accesses to overcome the transmission loss characteristic of the first network.

2. The apparatus of claim 1, wherein the processor circuitry is to execute the instructions to determine the difference between the first and second quantities of test impression notifications based on at least a networking hardware failure.

3. The apparatus of claim 1, wherein the processor circuitry is to execute the instructions to determine the difference between the first and second quantities of test impression notifications based on at least network congestion.

4. The apparatus of claim 1, wherein the processor circuitry is to execute the instructions to determine the weighted adjusted quantity of user-accessed media impression notifications based on a quantity of lost user-accessed media impression notifications for the first network and the first quantity of media impression notifications.

5. The apparatus of claim 1, wherein the market share is a first market share, and the processor circuitry is to execute the instructions to:
    determine a second network media impression adjustment factor based on a quantity of lost test impression notifications for a second network in the geographic region; and
    determine a second weighted adjusted quantity of user-accessed media impression notifications for the second network by applying the second network media impression adjustment factor to a quantity of successfully received user-accessed media impression notifications to generate a second product and weighting the second product based on a second market share of second subscribers corresponding to the second network in the geographic region.

6. The apparatus of claim 5, wherein the processor circuitry is to execute the instructions to sum the weighted adjusted quantity of user-accessed media impression notifications for the first network and the second weighted adjusted quantity of user-accessed media impression notifications for the second network to determine a third adjusted quantity of user-accessed media impression notifications, the third adjusted quantity of user-accessed media impression notifications corresponding to a substantial portion of a market of networks serving a geographic region.

7. The apparatus of claim 1, wherein the market share of the first subscribers corresponding to the first network in the geographic region is relative to second subscribers of other networks in the geographic region.

8. The apparatus of claim 1, wherein the processor circuitry is to execute the instructions to determine the first network media impression adjustment factor based on a first media impression loss rate for the test client device in communication with the first network and a second media impression loss rate for a second test client device in communication with the first network.

9. An apparatus comprising:
at least one memory;
machine-readable instructions stored in the apparatus; and
processor circuitry to execute the instructions to:
  determine a quantity of lost test impression notifications based on a first quantity of test impression notifications successfully received via first network communications at a server via a first network and a second quantity of test impression notifications transmitted by a test client device via the first network, the quantity of lost test impression notifications corresponding to a transmission loss characteristic of the first network,
  determine a first network media impression adjustment factor based on the quantity of lost test impression notifications for the first network in a geographic region,
  determine a weighted adjusted quantity of user-accessed media impression notifications for the first network by applying the first network media impression adjustment factor to the first quantity of media impression notifications to generate a product and weighting the product based on a market share of first subscribers corresponding to the first network in the geographic region, the weighted adjusted quantity of the user-accessed media impression notifications to correct an inaccuracy in a first quantity of media impression notifications received via second network communications, the inaccuracy resulting from the transmission loss characteristic of the first network, and
  store the weighted adjusted quantity of the user-accessed media impression notifications in association with a media identifier to credit corresponding media with a quantity of media accesses to overcome the transmission loss characteristic of the first network.

10. The apparatus of claim 9, wherein the processor circuitry is to execute the instructions to determine the difference between the first and second quantities of test impression notifications based on at least a networking hardware failure.

11. The apparatus of claim 9, wherein the processor circuitry is to execute the instructions to determine the difference between the first and the second quantities of test impression notifications for the first network based on at least network congestion.

12. The apparatus of claim 9, wherein the processor circuitry is to execute the instructions to determine the weighted adjusted quantity of the user-accessed media impression notifications based on a quantity of lost user-accessed media impression notifications for the first network and the first quantity of media impression notifications.

13. The apparatus of claim 9, wherein the processor circuitry is to execute the instructions to obtain demographic information associated with the first quantity of media impression notifications from a database proprietor.

14. The apparatus of claim 9, wherein the processor circuitry is to execute the instructions to send lost test impression notifications via the first network automatically by the test client device without the test client device being operated by a user.

15. The apparatus of claim 9, wherein the market share is a first market share, and the processor circuitry is to execute the instructions to:
  determine a second network media impression adjustment factor based on a quantity of lost test impression notifications for a second network in the geographic region; and
  determine a second weighted adjusted quantity of user-accessed media impression notifications for the second network by applying the second network media impression adjustment factor to a quantity of successfully received user-accessed media impression notifications to generate a second product and weighting the second product based on a second market share of second subscribers corresponding to the second network in the geographic region.

16. The apparatus of claim 15, wherein the processor circuitry is to execute the instructions to sum the weighted adjusted quantity of user-accessed media impression notifications for the first network and the second weighted adjusted quantity of user-accessed media impression notifications for the second network to determine a third adjusted quantity of user-accessed media impression notifications, the third adjusted quantity of user-accessed media impression notifications corresponding to a substantial portion of a market of networks serving a geographic region.

17. The apparatus of claim 9, wherein the processor circuitry is to execute the instructions to determine if the market share of the first subscribers corresponding to the first network in the geographic region relative to second subscribers of other networks in the geographic region.

18. The apparatus of claim 9, wherein the processor circuitry is to execute the instructions to determine the first network media impression adjustment factor based on a first media impression loss rate for the test client device in communication with the first network and a second media impression loss rate for a second test client device in communication with the first network.

* * * * *